(12) United States Patent
Roy

(10) Patent No.: US 9,098,296 B2
(45) Date of Patent: Aug. 4, 2015

(54) METHOD FOR REDUCING MEMORY LATENCY IN PROCESSOR

(75) Inventor: Sourav Roy, Kolkata (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 167 days.

(21) Appl. No.: 13/525,348

(22) Filed: Jun. 17, 2012

(65) Prior Publication Data

US 2013/0339619 A1  Dec. 19, 2013

(51) Int. Cl.
*G06F 12/12* (2006.01)
*G06F 9/38* (2006.01)

(52) U.S. Cl.
CPC ............ *G06F 9/3836* (2013.01); *G06F 9/3808* (2013.01); *G06F 9/3824* (2013.01)

(58) Field of Classification Search
CPC ....................................................... G06F 12/12
USPC ........... 711/133, 144, 118, 146, 119, E12.033
See application file for complete search history.

(56) References Cited

U.S. PATENT DOCUMENTS

| | | | | |
|---|---|---|---|---|
| 4,933,933 A | * | 6/1990 | Dally et al. | 370/406 |
| 5,353,426 A | * | 10/1994 | Patel et al. | 711/118 |
| 5,577,227 A | * | 11/1996 | Finnell et al. | 711/122 |
| 5,751,983 A | * | 5/1998 | Abramson et al. | 712/216 |
| 5,761,515 A | | 6/1998 | Barton, III | |
| 5,778,436 A | * | 7/1998 | Kedem et al. | 711/137 |
| 6,098,155 A | | 8/2000 | Chong, Jr. | |
| 2004/0133744 A1 | * | 7/2004 | Van Doren et al. | 711/118 |
| 2007/0174555 A1 | * | 7/2007 | Burtscher et al. | 711/137 |
| 2009/0106491 A1 | | 4/2009 | Piszczek | |
| 2010/0332804 A1 | * | 12/2010 | Golla et al. | 712/214 |
| 2011/0019531 A1 | | 1/2011 | Kim | |
| 2011/0078697 A1 | * | 3/2011 | Smittle et al. | 718/104 |
| 2011/0219221 A1 | | 9/2011 | Skadron | |

OTHER PUBLICATIONS

Kucuk et al, "Low-Complexity Reorder Buffer Architecture", Jun. 22-26, 2002, International Conference on Supercomputing, pp. 1-10.*
Chen et al, "Reducing Memory Latency via Non-blocking and Prefetching Caches", Jul. 2, 1992, Technical Report 92-06-03, Department of Computer Science and Engineering, University of Washington, Seattle, WA 98195, pp. 1-22.*
Mattson et al, "The 48-core SCC processor: the programmer's view", Proceedings of the 2010 ACM/IEEE International Conference for High Performance Computing, Networking, Storage and Analysis, Nov. 13, 2010, pp. 1-11.*
Garg et al, "A Review of Deadlock Recovery Techniques in Interconnection Networks", Journal of Computer Science and Engineering, vol. 6, Issue 1, Mar. 2011, pp. 1-8.*
Srikanth T. Srinivasan et al., "Continual Flow Pielines, Continual Flow Pipelines," ASPLOS '04, pp. 107-119, 2004.

(Continued)

*Primary Examiner* — Cheng-Yuan Tseng
*Assistant Examiner* — Kamal K Dewan
(74) *Attorney, Agent, or Firm* — Charles Bergere

(57) ABSTRACT

A method for reducing memory latency in a processor includes identifying an independent instruction (or cache miss instruction) and corresponding dependent instructions from a re-circulating issue window (RIW) when a cache miss is encountered. The cache miss instruction and corresponding dependent instructions are moved to a re-circulating issue buffer (RIB) and moved back to the RIW from the RIB for processing when the cache miss is resolved.

12 Claims, 4 Drawing Sheets

(56) References Cited

OTHER PUBLICATIONS

H. Akkary, R. Rajwar, and S.T. Srinivasan, "Checkpoint Processing and Recovery: An Efficient, Scalable Alternative to Reorder Buffers," IEEE Micro, Nov.-Dec. 2003.

S. Nekkalapu, H. Akkary, K. Jothi, R. Retnamma and X. Song, "A Simple Latency Tolerant Processor," Proceedings of International Conference on Computer Design (ICCD), pp. 384-389, 2008.

G. Hinton, D. Sager, M. Upton, D. Boggs, D. Carmean, A. Kyker, and P. Rouossel, "The Microarchitecture of the Pentium(r) 4 Processor," Intel Technology Journal, Q1, 2001.

A. Cristal, O.J. Santana, F. Cazorla, M. Gulluzzi, T. Ramirez, M. Pericas, and M. Valero, "Kilo-Instruction Processors: Overcoming the Memory Wall," IEEE Micro, May-Jun. 2005.

O. Mutlu, H. Kim, and Y.N. Patt, "Efficient Runahead Execution: Power-Efficient Memory Latency Tolerance," IEEE Micro, Jan.-Feb. 2006.

Alvin R. Lebeck; Jinson Koppanalil; Tong Li; Jaidev Patwardhan and Eric Rotenberg; A Large, Fast Instruction Window for Tolerating Cache Misses, 29th Annual International Symposium on Computer Architecture, 2002, pp. 59-70.

\* cited by examiner

METHOD FOR REDUCING MEMORY LATENCY IN PROCESSOR

BACKGROUND OF THE INVENTION

The present invention generally relates to processors, and more particularly, to reducing memory latency in a processor.

Memory latency refers to the time required by a processor to fetch data required for execution of one or more instructions from a memory. Memory latency impacts the efficiency and performance of the processor because execution of instructions is stalled until the required data is made available.

FIG. 1 is a schematic block diagram of a conventional processor 100. The processor 100 includes a decoder 102, a branch predictor 103, an issue window 104, a bus 106, a branch unit 108, an arithmetic logic unit (ALU) 110, a load store unit 112 and a cache memory 114. The branch unit 108, the arithmetic logic unit (ALU) 110, and the load store unit 112 are together referred to as a processing unit 116. The processor 100 receives a set of instructions 116 for execution and the decoder 102 decodes the instructions 116 and provides the decoded instructions to the issue window 104. The branch predictor 103 predicts a selection of a branch in a program flow of the instructions 116 to maintain a pipeline of instructions for execution by the processor 100, which optimizes the processing speed of the processor 100. The issue window 104 issues the instructions to the processing unit 116 for execution. The branch unit 108 executes branch instructions, the ALU 110 executes arithmetic and logic instructions, and the load store unit 112 executes load and store instructions. The load store unit 112 loads data from the cache memory 114 and stores data to the cache memory 114. The cache memory 114 requests the data from an external memory (not shown in FIG. 1). Various elements of the processor 100 as described in FIG. 1 are interconnected by way of the bus 106.

The cache memory 114 operates faster than the external memory, provides faster access to the data required for executing instructions, and reduces the processing time of the processor 100. However, the cache memory 114 can store only a limited amount of data and the data required for executing an instruction 116 may not always be available in the cache memory 114, a condition which is referred to as a cache miss. When a cache miss is encountered, the cache memory 114 tries to retrieve the required data from the external memory to resolve the cache miss. However, retrieving data from the external memory takes time because of the comparatively slower speed of the external memory. For example, it can take up to 100 processor cycles or more to resolve a cache miss, which increases the memory latency, and impacts the performance of the processor 100. During a cache miss, the processor 100 not only stalls execution of instructions that need the requested data, but also of other instructions that are dependent on the cache miss instructions, which partially or completely blocks the issue window 104 and slows the processor 100. On partial blockage of the issue window 104, though the processor 100 continues to execute other instructions, its processing capacity is underutilized.

Therefore, there is a need for a solution that efficiently manages cache misses in a processor, that reduces memory latency and improves speed and performance of a processor and that overcomes the above-mentioned limitations of existing processors.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for reducing memory latency in a processor is provided. The processor includes a re-circulating issue window (RIW) for issuing a plurality of instructions to the processor for execution. A first instruction from the plurality of instructions that encounters a cache miss is identified. The first instruction is moved from the RIW to a re-circulating issue buffer (RIB) by a RIW controller. The first instruction is moved from the RIB to the RIW by the RIW controller when the cache miss is resolved.

In another embodiment of the present invention, a processor is provided. The processor includes a re-circulating issue window (RIW) that receives a plurality of instructions and a processing unit for executing the plurality of instructions. A re-circulating issue buffer (RIB) stores a first instruction of the plurality of instructions that encounters a cache miss. A RIW controller is connected to the RIB and the RIW. The RIW controller moves the first instruction from the RIW to the RIB when the cache miss is encountered, and the RIW controller moves the first instruction from the RIB to the RIW when the cache miss is resolved.

Various embodiments of the present invention provide a processor and a method for reducing memory latency in the processor by efficiently handling a cache miss. When a cache miss is encountered, the processor moves the cache miss instruction and corresponding dependent instructions from a re-circulating issue window (RIW) to a re-circulating issue buffer (RIB) and frees the RIW to process subsequent instructions, thereby reducing the memory latency. The cache miss and corresponding dependent instructions are moved to the RIW from the RIB when the cache miss is resolved and then these instructions are executed by the processor. Moving the cache miss and dependent instructions to the RIB also prevents the processor from slowing down or stalling due to partial or complete blocking of the RIW and thus improves the speed and performance of the processor.

Figure 1:
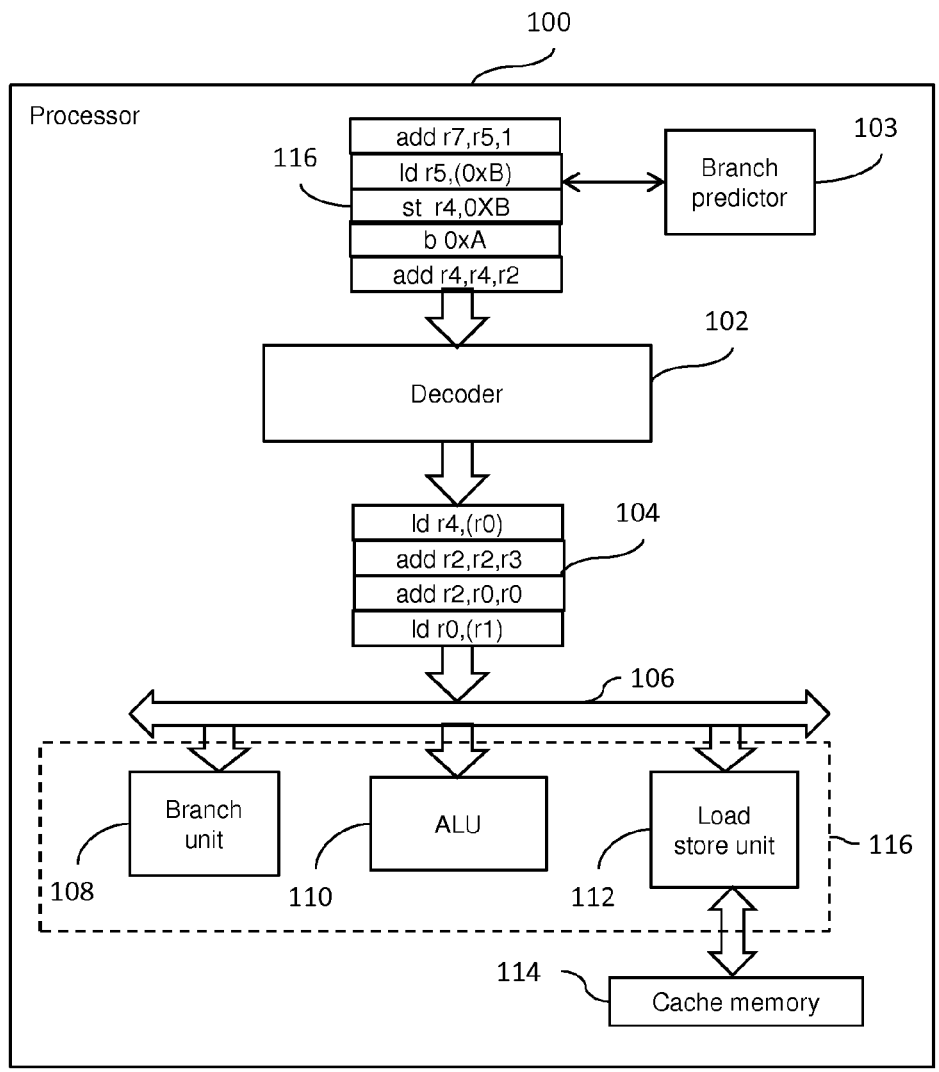
FIG. 1 is a schematic block diagram of a conventional processor.
Figure 2:
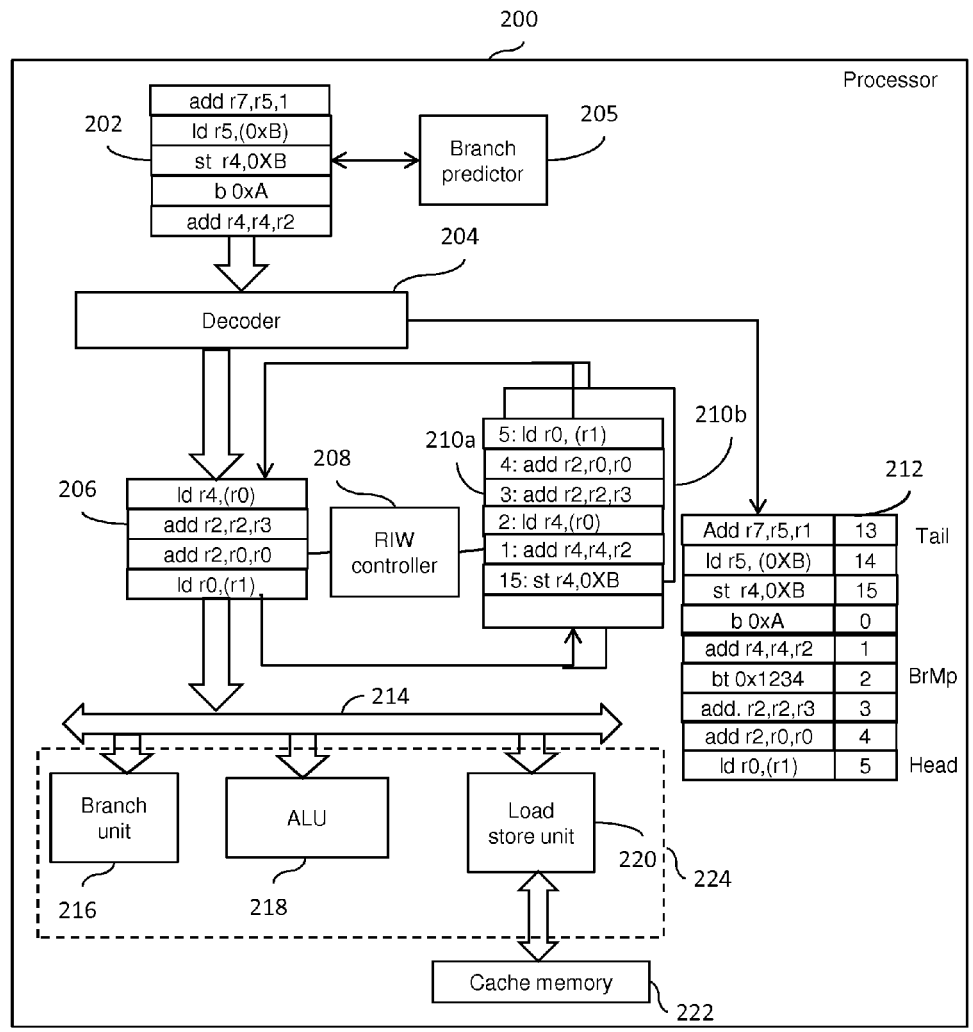
FIG. 2 is a schematic block diagram of a processor in which an embodiment of the present invention is implemented.

FIG. 2 shows a schematic block diagram of a processor 200 in which an embodiment of the present invention is implemented. The processor 200 receives a set of instructions 202 for execution and includes a decoder 204, a branch predictor 205, a re-circulating issue window (RIW) 206, an RIW controller 208, a plurality of re-circulating issue buffers (RIBs) including first and second RIBs 210a and 210b (collectively referred to as RIBs 210), a re-order buffer (ROB) 212, a bus 214, a branch unit 216, an arithmetic logic unit (ALU) 218, a load store unit 220, and a cache memory 222. The branch unit 216, the arithmetic logic unit (ALU) 218, and the load store unit 220 are together referred to as a processing unit 224. The decoder 204 decodes the instructions 202 and moves the decoded instructions into the RIW 206. The branch predictor 205 predicts a selection of a branch in a program flow of instructions 202 to maintain a pipeline of instructions for execution by the processor 200. The ROB 212 is a buffer that indexes the decoded instructions according to a program order, to specify an order for execution. In various embodiments of the present invention, the ROB 212 indexes the instructions in a circular queue using a head pointer that indicates a first instruction in the circular queue and a tail pointer that indicates a last instruction in the queue. When a new instruction is decoded, the ROB 212 assigns an index of (tail-1) according to the circular queue and redefines the tail pointer. For example, the index of 12 (i.e., 13−1) is assigned to a new instruction that enters the ROB 212, because the index of the tail instruction 'Add r7, r5, r1' is 13 (see FIG. 2). The tail pointer is redefined to indicate the new instruction with index 12 as the last instruction. Similarly, the head pointer is redefined to point to the second instruction in the circular queue when the execution of the first instruction is completed. The indexing of the instructions in the circular queue by way of head and tail pointers ensures that the index assigned to each instruction remains unchanged until the instruction is executed.

The RIW 206 issues the instructions 202 to the processing unit 224 (i.e., at least one of the ALU 218, branch unit 216 and load store unit 220, based on the type of instruction) for execution according to the program order specified by the assigned indices. An example of instructions 202 is illustrated in table A.

TABLE A

Set of Instructions

| Instruction Number | Instruction Type | Destination Reg. | Source Reg. |
|---|---|---|---|
| In_1 | Load | R1 | (R0) |
| In_2 | Add | R2 | R1, R0 |
| In_3 | Add | R3 | R2, 0 |
| In_4 | Load | R4 | (0xA) |
| In_5 | Add | R5 | R4, 1 |
| In_6 | Load | R7 | (R6) |

Each instruction of TABLE A refers to a destination and one or more source registers, which are a part of a register file (not shown in FIG. 2) of the processor 200. Each register includes a data field and a multi-bit dependence field. The data field stores data values for the register and the multi-bit dependence field stores an indication of a cache miss.

The load store unit 220 fetches the data required for executing instructions from the cache memory 222 and also stores the required data in the cache memory 222. The execution of instructions that encounter a cache miss is stalled until the cache memory 222 retrieves the required data from an external memory (not shown in FIG. 2). The RIW controller 208 moves instructions that encounter a cache miss to the RIB 210. Various elements of the processor 200 as described in FIG. 2 are interconnected by way of the bus 214.

Instructions that encounter a cache miss are hereinafter referred to as 'cache miss instructions'. The RIW controller 208 also moves one or more dependent instructions, i.e., the instructions that depend on the cache miss instruction, to the RIB 210. A dependent instruction may be an instruction that requires the cache miss data or a result of the execution of the cache miss instruction.

Dependent instructions are identified based on the value stored in the multi-bit dependence field of a register. When a cache miss is encountered for a first independent instruction (i.e., the cache miss instruction), the multi-bit dependence field of the destination register thereof is set to one (1). An exemplary register file corresponding to the instructions shown in Table A is illustrated in table B.

TABLE B

| Register file | |
|---|---|
| Register | Multi-bit Dependence field |
| R0 | 0 |
| R1 | 1 |
| R2 | 1 |
| R3 | 1 |
| R4 | 0 |
| R5 | 0 |
| R6 | 0 |
| R7 | 2 |

Assuming the instruction In_1 from TABLE A to be the first independent instruction that encounters a cache miss, the multi-bit dependence field of the destination register (R1) is set to 1. The instruction In_2 includes registers R1 and R2 that are source and destination registers, respectively. The RIW controller 208 identifies the multi-bit dependence field of the source register R1 that is set to 1 and then sets the multi-bit dependence field of the destination register R2 to 1. Thus, the instruction In_2 is marked as a dependent instruction. Similarly, the instruction In_3 is identified as another dependent instruction of the instruction In_1. The RIW controller 208 then moves the instructions In_1, In_2, and In_3 to the RIB 210.

As the instructions In_4 and In_5 are not dependent on a cache miss, the multi-bit dependence fields of destination registers thereof (R4 and R5) remain zero and the instructions are executed by the load store unit 220 and ALU 218, respectively. Assuming the instruction In_6 to be another cache miss instruction, the RIW controller 208 sets the multi-field dependence field of the destination register thereof (R7) to two (2) and moves the instruction In_6 to the second RIB 210b. Subsequent instructions that have source registers with the multi-bit dependence field set to 2 are respectively moved to the second RIB 210b by the RIW controller 208.

In various embodiments of the present invention, the multi-bit dependence field is set as part of a register write operation. Future references to a register that has the multi-bit dependence field set are made as per the standard register renaming process, so that each register is written by only one instruction in the RIW 206.

Instructions that are dependent on two cache misses can go to either of the first and second RIBs 210a and 210b. If the dependent instructions are moved to the first RIB 210a, the instructions are first moved into the RIW 206 when the cache miss corresponding to the first RIB 210a (i.e., the first cache miss) is resolved. Thereafter, the dependent instructions are moved to the second RIB 210b as the second cache miss stands unresolved. After the second cache miss is resolved, the dependent instructions are moved into the RIW 206 for execution. Although only two RIBs are illustrated in FIG. 2, it will be appreciated by a skilled artisan that the processor 200 may include any other suitable number of RIBs to handle multiple cache misses that may occur concurrently.

When the cache miss is successfully resolved (i.e., the required data is made available with the cache memory 222), the cache memory 222 sends a signal or issues an interrupt to the RIW controller 208, which in turn moves the cache miss instruction and the corresponding dependent instructions to the RIB 206 for execution by at least one of the branch unit 216, the ALU 218 and the load store unit 220. In addition, the RIW controller 208 clears the multi-bit dependence fields of the registers corresponding to the cache miss and corresponding dependent instructions. The moving of the instructions into the RIW 206 from the RIB 210 is prioritized over insertion of new instructions from the decoder 204 into the RIW 206.

In an embodiment of the present invention, a deadlock condition may arise if the RIB 210 is fully occupied with a cache miss instruction and corresponding dependent instructions. For example, the RIW 206 may get fully or partially blocked when the number of dependent instructions is more than the number of instructions that can be accommodated by the RIB 210 due to which the RIW 206 is no longer capable of moving all corresponding dependent instructions in to the RIB 210. If the RIW 206 gets fully blocked, instructions from RIB 210 cannot be moved into the RIW 206 even when the cache miss is resolved, which leads to a deadlock condition. To resolve the deadlock, the RIW controller 208 initiates a circular movement of instructions between the RIW 206 and the RIB 210, in which the instructions from the RIB 210 are moved to the RIW 206 as and when the cache miss is resolved and the instructions from the RIW 206 are moved to the RIB 210. In due course, all instructions are moved into the RIW 206 for execution. Thus, a circular movement between the RIW 206 and the RIB 210 helps in resolving the deadlock and executing the instructions.

In case a branch mis-prediction is identified, the RIW controller 208 deletes instructions related to the mis-predicted branch, from the RIB 210, which enhances the speed of execution of instructions in the processor 200.

Figure 3:
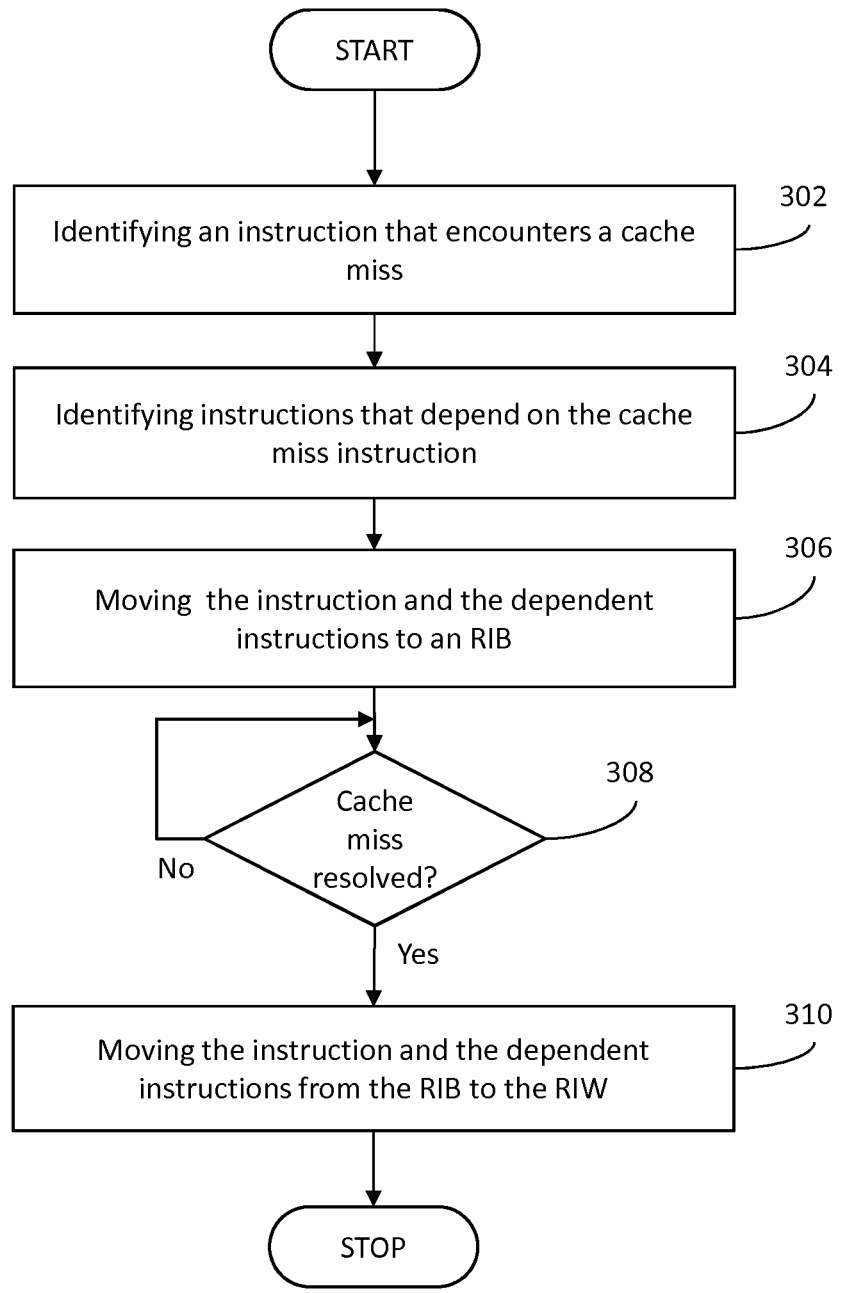
FIG. 3 is a flow chart illustrating a method for reducing memory latency in a processor in accordance with an embodiment of the present invention.

Referring now to FIG. 3, a flow chart illustrating a method for reducing memory latency in the processor 200 in accordance with an embodiment of the present invention is shown. FIG. 3 is explained below in conjunction with FIG. 2. At step 302, an instruction that encounters a cache miss is identified by the cache memory 222. At step 304, the RIW controller 208 checks if there is any instruction in the RIW 206 that is dependent on the cache miss instruction. At step 306, the RIW controller 208 moves the cache miss instruction and the corresponding dependent instructions to the RIB 210. At step 308, the RIW controller 208 checks if the cache miss has been resolved. The cache memory 222 transmits a signal, issues an interrupt, or causes an interrupt to be issued to the RIW controller 208 when the cache miss is resolved. When the cache miss is resolved, the RIW controller 208 moves the cache miss instruction and the dependent instructions to the RIW 206 from the RIB 210 for execution, at step 310. Moving instructions to the RIB 210 prevents the RIW 206 from getting partially or completely blocked and frees the RIW 206 to accommodate new instructions.

Figure 4:
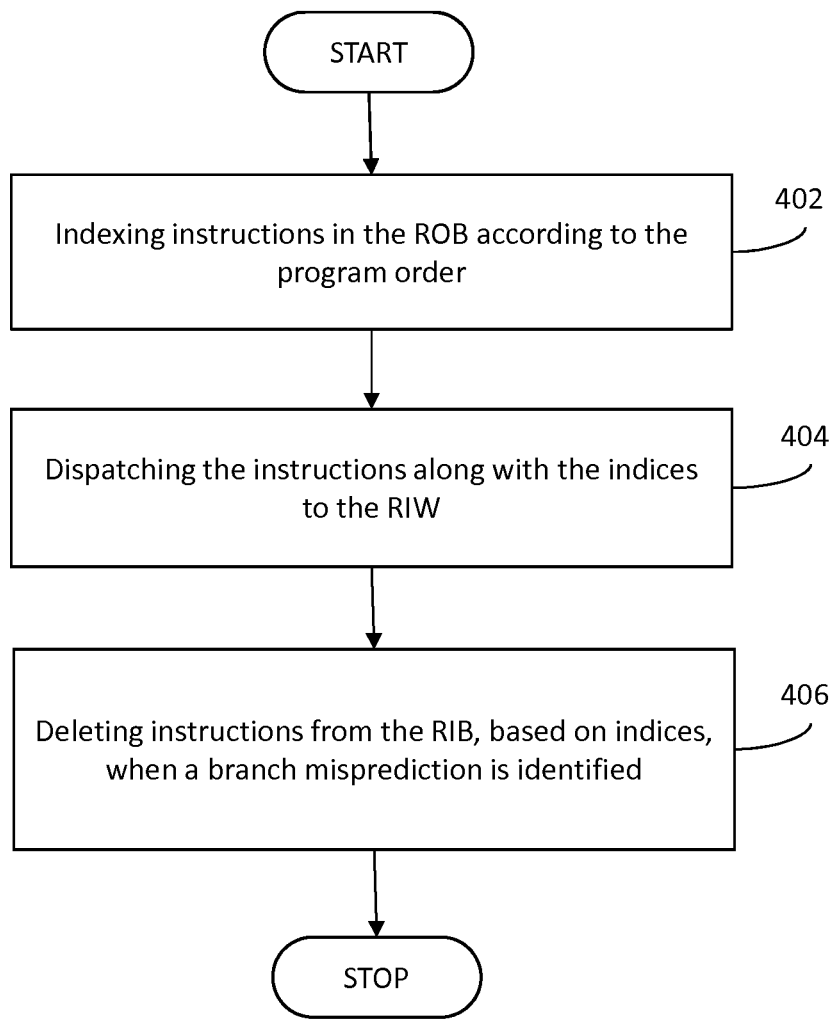
FIG. 4 is a flow chart illustrating a method for handling a branch misprediction in a processor in accordance with an embodiment of the present invention.

Referring now to FIG. 4, a flow chart illustrating a method for handling a branch misprediction in the processor 200, in accordance with an embodiment of the present invention is shown. FIG. 4 is explained in conjunction with FIG. 2. At step 402, instructions in the ROB 212 are indexed in a circular queue according to the program order using head and tail pointers. The head and tail pointers indicate the first and last instructions in the circular queue, respectively. For example, the ROB 212 includes nine instructions with indices 0-5 and 13-15, where the head and tail pointers indicate the first and last instructions—"ld r0,(r1)" with index 5 and "Add r7,r5,r1" with index 13, respectively (refer to FIG. 2). At step 404, the instructions and the corresponding indices are inserted into the RIW 206. The indices are stored in the form of 'tail-1' in the instruction field. When a branch mis-prediction is identified, at step 406, instructions that have indices between the tail pointer and the instruction at which the branch mis-prediction is identified, are deleted from the RIB 210. As used herein, the term delete means removing the instructions by removing or clearing them from the RIB 210. For example, instructions with indices 13, 14, 15, 0 and 1 are deleted if a branch mis-prediction is identified at the instruction "bt 0x1234" with index 2. Deleting instructions from the RIB 210 may require multiple cycles without any performance degradation, since new instructions are decoded and sent to the RIW 206 for execution during these cycles.

The present invention can also be practiced in processors that have multiple issue windows (also called reservation stations) instead of a central issue window as shown in FIG. 2. In this case, each of the branch units 216, the ALU 218 and the load store unit 220 may have a separate reservation station. The present invention may also be implemented using a centralized RIB with separate reservation stations. Instructions dependent on different cache misses are separated using different RIBs as discussed earlier. The present invention may also be implemented in simultaneous, multi-threaded (SMT) processors in which instructions from a thread that suffers a cache miss are moved to the RIB so that other threads are allowed to proceed.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for reducing memory latency in a processor, wherein the processor includes a re-circulating issue window (RIW) for issuing a plurality of instructions to a processor unit for execution, the method comprising: identifying a first instruction from the plurality of instructions that encounters a cache miss;

identifying at least one dependent instruction from the plurality of instructions that depends on the first instruction;

moving the first instruction to a re-circulating issue buffer (RIB) by an RIW controller;

moving the at least one dependent instruction to the RIB by the RIW controller;

moving the first instruction from the RIB to the RIW by the RIW controller when the cache miss is resolved;

moving the at least one dependent instruction from the RIB to the RIW by the RIW controller when the cache miss is resolved; and if a deadlock condition is encountered whereby the RIB is full and a cache miss instruction cannot be moved from the RIW to the RIB, then circulating the plurality of instructions between the RIW and the RIB by the RIW controller, based on a failure to move the first instruction and the at least one dependent instruction from the RIB to the RIW.

2. The method of claim 1, wherein identifying the at least one dependent instruction comprises comparing a multi-bit dependence field of a source register from the at least one dependent instruction with a multi-bit dependence field of a destination register from the first instruction.

3. The method of claim 1, further comprising indexing the plurality of instructions in a re-order buffer (ROB) in a circular queue by way of a head pointer that indicates a first instruction in the circular queue and a tail pointer that indicates a last instruction in the circular queue.

4. The method of claim 3, further comprising re-defining the head and tail pointers based on at least one of an addition and a deletion of an instruction from the ROB, such that the indexing of the plurality of instructions remains constant till the execution thereof by the processor.

5. The method of claim 3, further comprising deleting at least one instruction from the RIB corresponding to a branch mis-prediction, based on the indexing of the plurality of instructions, thereby allowing the processor to continue executing the plurality of instructions without stalling.

6. A processor, comprising:
a re-circulating issue window (RIW) for receiving a plurality of instructions;
a processing unit coupled to the RIW for executing the plurality of instructions;
a re-circulating issue buffer (RIB) for storing a first instruction of the plurality of instructions that encounters a cache miss; and
a RIW controller, connected to the RIB and the RIW, that moves the first instruction from the RIW to the RIB when the cache miss is encountered, identifies at least one dependent instruction from the plurality of instructions that depends on the first instruction, moves the at least one dependent instruction from the RIW to the RIB, moves the first instruction and the at least one dependent instruction from the RIB into the RIW when the cache miss is resolved, and if a deadlock condition arises whereby the RIB is full and the RIW is blocked by cache miss instructions such that resolved cache miss instructions cannot be moved from the RIB to the RIW to release space in the RIB, then the RIW controller circulates the plurality of instructions between the RIW and the RIB, based on a failure to shift the first instruction and the at least one dependent instruction from the RIB to the RIW when the RIB is full.

7. The processor of claim 6, wherein the processing unit comprises at least one of an arithmetic logic unit (ALU), a branch unit and a load store unit.

8. The processor of claim 6, wherein the RIW controller identifies the at least one dependent instruction by comparing a multi-bit dependence field of a source register from the at least one dependent instruction with a multi-bit dependence field of a destination register from the first instruction.

9. The processor of claim 7, further comprising a re-order buffer (ROB) for maintaining a program order by indexing the plurality of instructions in a circular queue by way of a head pointer that indicates a first instruction in the circular queue and a tail pointer that indicates a last instruction in the circular queue.

10. The processor of claim 9, wherein the ROB further re-defines the head and tail pointers based on at least one of an addition and a deletion of an instruction from the ROB, such that the indexing of the plurality of instructions remains constant till the execution thereof by the processing unit.

11. The processor of claim 9, wherein the RIW controller further deletes at least one instruction from the RIB corresponding to a branch mis-prediction, based on the indexing of the plurality of instructions, thereby allowing the processing unit to continue executing the plurality of instructions without stalling.

12. The processor of claim 6, further comprising a cache memory coupled to the processor for storing temporary data corresponding to execution of the plurality of instructions.

* * * * *